US012647920B2

(12) United States Patent
Corretjer et al.

(10) Patent No.: US 12,647,920 B2
(45) Date of Patent: Jun. 2, 2026

(54) RADIO, METHOD, AND COMMUNICATION SYSTEM PROVIDING DYNAMIC RE-TUNING OF A RADIO SUBSCRIBER TEMPERATURE COMPENSATED CRYSTAL OSCILLATOR (TCXO)

(71) Applicant: MOTOROLA SOLUTIONS, INC., Chicago, IL (US)

(72) Inventors: Jesus F Corretjer, Weston, FL (US); Daniel C Altenhofen, Deforest, WI (US); Anuj Kapoor, Palatine, IL (US); Shivakumar Bangalore Ramu, Weston, FL (US); Ernesto Fiallo Herrera, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 308 days.

(21) Appl. No.: 18/605,867

(22) Filed: Mar. 15, 2024

(65) Prior Publication Data

US 2025/0294489 A1 Sep. 18, 2025

(51) Int. Cl.
*H04W 56/00* (2009.01)
*H04W 4/10* (2009.01)

(52) U.S. Cl.
CPC .......... *H04W 56/0055* (2013.01); *H04W 4/10* (2013.01)

(58) Field of Classification Search
CPC ............................ H04W 56/0055; H04W 4/10
See application file for complete search history.

(56) References Cited

U.S. PATENT DOCUMENTS

| | | | | |
|---|---|---|---|---|
| 5,701,589 A | 12/1997 | Lee et al. | | |
| 6,229,991 B1 * | 5/2001 | Hietala | .................... | H03J 7/045 |
| | | | | 455/75 |
| 6,463,266 B1 * | 10/2002 | Shohara | .................. | H04B 1/26 |
| | | | | 375/345 |
| 2002/0177458 A1 * | 11/2002 | Hokao | ...................... | H03J 7/02 |
| | | | | 455/502 |
| 2016/0182066 A1 * | 6/2016 | Ta | ............................ | H03L 7/18 |
| | | | | 331/1 R |

FOREIGN PATENT DOCUMENTS

| | | |
|---|---|---|
| CN | 1913597 A | 2/2007 |
| DE | 19948799 A1 | 5/2000 |
| JP | 2010193082 A | 9/2010 |

* cited by examiner

*Primary Examiner* — Won Tae C Kim
(74) *Attorney, Agent, or Firm* — Barbara R Doutre

(57) ABSTRACT

A communication system embeds a trust message into an outbound control channel signal derived from a GPS reference signal associated with trunked communications. The trust message is used as a basis for incrementally expanding the subscriber's automatic frequency control (AFC) range beyond its pre-stored default limits to enable re-tuning a temperature compensated crystal oscillator (TCXO) that has drifted off frequency. Coarse-tuning of the subscriber TCXO is based on a measured frequency error of a control channel outbound transmission determined to fall within the expanded AFC range of the subscriber. Additionally, an inbound signal frequency error may be measured by the base station, and reported to the subscriber to use for fine-tuning the TCXO.

24 Claims, 4 Drawing Sheets

200

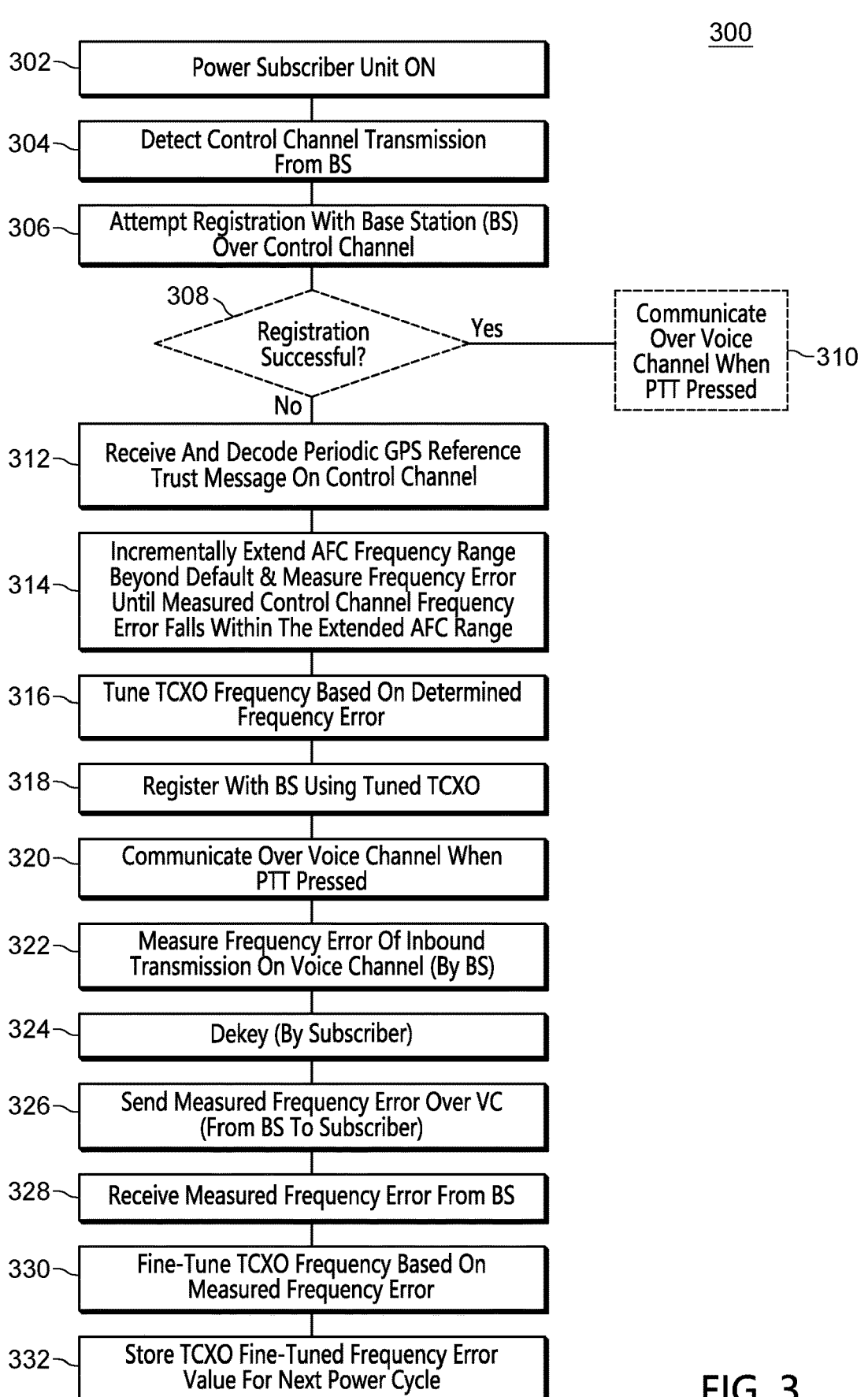

300

302 — Power Subscriber Unit ON

304 — Detect Control Channel Transmission From BS

306 — Attempt Registration With Base Station (BS) Over Control Channel

308 — Registration Successful?

Yes → Communicate Over Voice Channel When PTT Pressed — 310

No

312 — Receive And Decode Periodic GPS Reference Trust Message On Control Channel 314 — Incrementally Extend AFC Frequency Range Beyond Default & Measure Frequency Error Until Measured Control Channel Frequency Error Falls Within The Extended AFC Range 316 — Tune TCXO Frequency Based On Determined Frequency Error 318 — Register With BS Using Tuned TCXO 320 — Communicate Over Voice Channel When PTT Pressed 322 — Measure Frequency Error Of Inbound Transmission On Voice Channel (By BS)

324 — Dekey (By Subscriber)

326 — Send Measured Frequency Error Over VC (From BS To Subscriber)

328 — Receive Measured Frequency Error From BS

330 — Fine-Tune TCXO Frequency Based On Measured Frequency Error

332 — Store TCXO Fine-Tuned Frequency Error Value For Next Power Cycle

FIG. 3

GPS

RF Site Controller

Voice Channel Base Station

Control Channel Base Station

Subscriber

OSPs

402

NO COMMS

404

Unit Registration

VC Assignment

406

408

410

412

414

416

PTT Voice Call At The End Of The Voice Call Frequency Error Of The Inbound Subscriber Is Reported Back To The Subscriber

RADIO, METHOD, AND COMMUNICATION SYSTEM PROVIDING DYNAMIC RE-TUNING OF A RADIO SUBSCRIBER TEMPERATURE COMPENSATED CRYSTAL OSCILLATOR (TCXO)

BACKGROUND OF THE INVENTION

Trunked communication systems include subscriber radios which share several channel frequencies. Unlike conventional radio systems which use a dedicated channel (frequency) for communication, the trunked system allows for multiple talkgroups to communicate simultaneously without interfering with each other.

Subscriber radios of the trunked communication system may operate using a temperature compensated crystal oscillator (TCXO) from which all clock signals and timing control signals are derived for various radio functionality, such as radio frequency (RF) transmit, receive, audio, and over the air (OTA) protocol synchronization, to name a few.

There are conditions under which the TCXO frequency may drift and cause performance issues. For example, radios stored in a warehouse for long periods of time may suffer from frequency drift when eventually deployed in the field. The TCXO frequency drift may cause operational issues, including inability to transmit or receive properly.

The re-tuning of radios through service shops takes time, equipment and money. Hence, the ability to re-tune radios automatically in the field is highly desirable. Tuning approaches have been challenged by operational limits of the subscriber radio which are purposely set to avoid interference from a fake or interfering signal, sometimes referred to as radio spoofing.

Accordingly, there is a need for improved automated re-tuning a subscriber unit of a trunked communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a flowchart of a method for managing automatic frequency control (AFC) of a radio subscriber unit in accordance with some embodiments.

Figure 1:
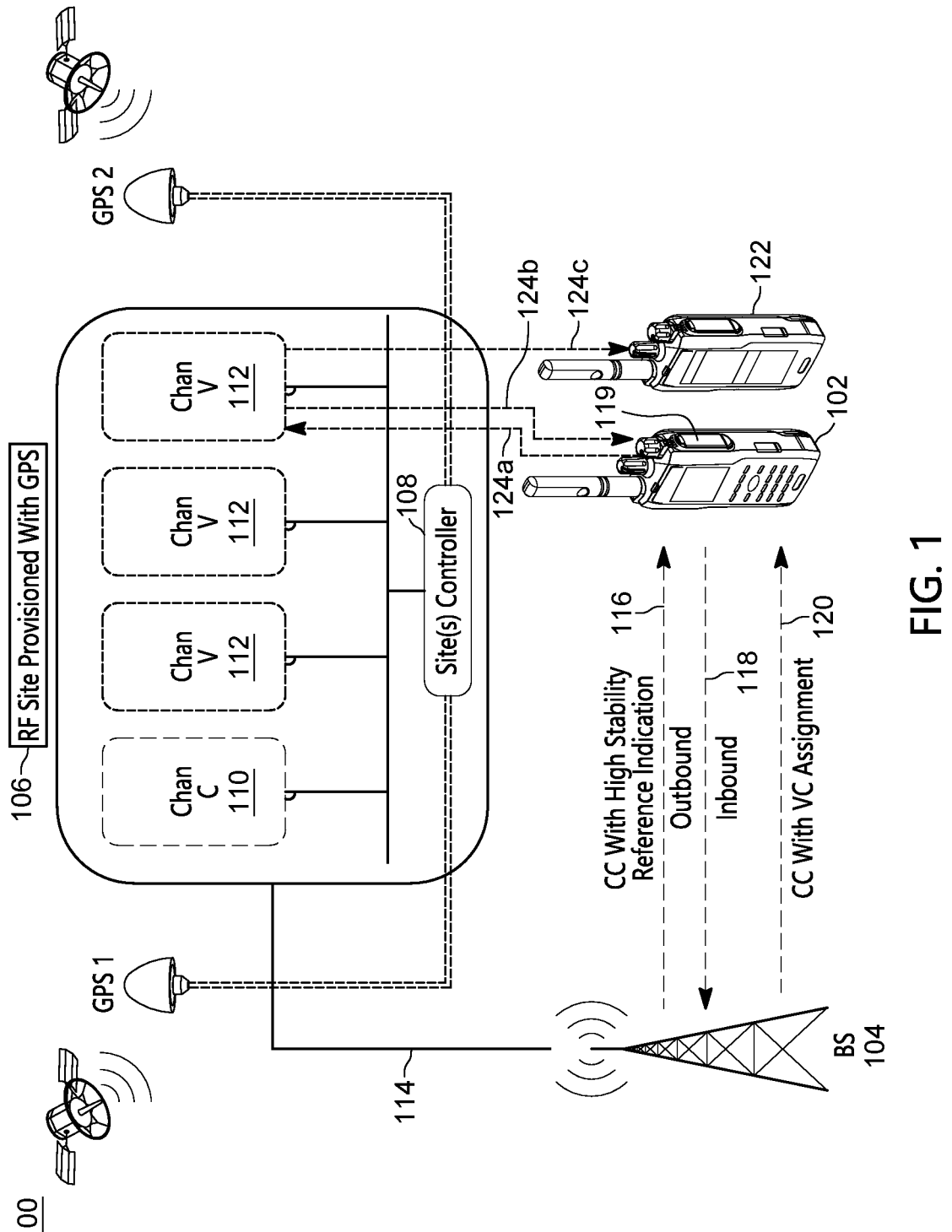
FIG. 1 is a diagram of a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a radio subscriber unit, method and communication system which provide automatic re-tuning of a radio subscriber unit through dynamic expansion of an automatic frequency control (AFC) feature to automatically correct frequency error. The embodiments account for the differences in frequency error tolerance of a base station and a radio subscriber unit purposely set to be greater than the base station. For example, a base station may receive an inbound signal that falls within +/−2 KHz of the current channel frequency, while the frequency error tolerance of the subscriber radio is purposely set to be greater than the base station. For example, the present subscriber AFC configuration may allow for correction of frequency errors of up to +/−4 KHz. The embodiments provided herein take advantage of a GPS capable base station having a very high accuracy and trustworthy reference which is used to re-tune a subscriber's clock reference signal while the subscriber is affiliated with the base station.

In one embodiment, a trunked communication system is provided which includes a base station and plurality of radio subscriber units, wherein at least one radio subscriber unit comprises a microcontroller configured to: scan and detect a control channel outbound transmission from the base station; decode a trust message embedded within the control channel outbound transmission, the trust message being indicative of a stable GPS reference frequency associated with the base station; expand an automatic frequency control (AFC) range beyond default limits while taking frequency error measurements of the control channel outbound transmission until the measured frequency error is determined to fall within an expanded AFC range; and coarse-tune a temperature crystal oscillator (TCXO) of the radio subscriber unit using the measured frequency error determined to fall within the expanded AFC range. In some embodiments, the trust message may be decoded in response to an unsuccessful registration attempt by the radio subscriber unit to register with the base station when the radio subscriber unit is powered on. The trust message may also be decoded automatically prior to, or during, a registration attempt. In some embodiments, the microcontroller is further configured to: register with the base station, over the control channel, using an inbound transmission derived from the tuned TCXO; enable push-to-talk (PTT) communications over a voice channel by pressing a PTT of the radio subscriber unit; receive, back from the base station over the voice channel, a measured inbound frequency error associated with an inbound voice transmission of the radio subscriber unit; and fine-tune the TCXO based on the measured inbound frequency error.

Another embodiment provides for a method of tuning a radio subscriber unit in a communication system, the method including: determining that a temperature compensated crystal oscillator (TCXO) of the subscriber unit is out-of-tune; receiving and decoding a trust message embedded in a control channel outbound transmission sent periodically over a control channel frequency that is aligned to a stable GPS reference; incrementally expanding an automatic frequency control (AFC) range of the radio subscriber unit beyond a pre-stored default limit in response to the trust message, while measuring a frequency error of the control channel outbound transmission, until the measured frequency error is determined to fall within the extended AFC range; and coarse-tuning the TCXO using the determined frequency error. In some embodiments, the trust message is decoded in response to an unsuccessful registration attempt by the radio subscriber unit to register with the base station when the radio subscriber unit is powered on. In some embodiments, the method further provides fine tuning the TCXO. The fine tuning may be accomplished by registering the subscriber unit, over the control channel, with the base station using the coarse-tuned TCXO; enabling PTT communications over a voice channel by pressing a PTT of the subscriber; receiving, back from the base station over the voice channel, a measured inbound frequency error associated with an inbound voice transmission of the radio subscriber unit; and fine-tuning the TCXO based on the measured inbound frequency error. The measured inbound frequency error may be measured by the base station and sent to the radio subscriber unit when the PTT of the radio subscriber unit is released. The tuning values may be stored in a persistent memory of the subscriber unit and applied during power-up cycles of the subscriber unit.

In another embodiment, a radio subscriber unit is provided which includes a temperature compensated crystal oscillator (TCXO) generating a reference clock signal; and a microcontroller coupled to the TCXO, wherein the microcontroller is configured to: receive and decode a trust message periodically sent from a base station over a control channel frequency, wherein the control channel frequency is derived based on a GPS signal; in response to the trust message, incrementally expand an automatic frequency control (AFC) range of an AFC engine beyond a pre-stored default limit, while measuring, by the AFC engine, a frequency error associated with a control channel outbound transmission until the measured frequency error is determined to fall within the extended AFC range; and coarse-tune the TCXO using the determined frequency error to align the TCXO towards its original frequency, thereby minimizing frequency error associated with the TCXO reference clock. In some embodiments, the trust message is decoded in response to an unsuccessful registration attempt by the radio subscriber unit to register with the base station when the radio subscriber unit is powered on. In some embodiments, the microcontroller is further configured: register, over the control channel, with the base station using the coarse-tuned TCXO; enable PTT communications over a voice channel by pressing a PTT of the subscriber; receive, back from the base station over the voice channel, a measured inbound frequency error associated with an inbound voice transmission of the radio subscriber unit; and fine-tune the TCXO based on the measured inbound frequency error. The measured inbound frequency error is sent to the radio subscriber unit when the PTT is released. The: frequency error associated with the outbound and/or inbound signals may be stored in memory of the subscriber unit to tune the TCXO during power-up of the subscriber unit.

The various embodiments further provide for storing the measured inbound frequency error as a fine-tuned frequency error in a persistent memory of the subscriber unit. The stored fine-tuned frequency error may further be used to tune the TCXO in response to subsequent power-ups of the radio subscriber unit.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of a communication system 100 formed and operating in accordance with some embodiments. Communication system 100 is a trunked radio communications system comprising a plurality of radio subscriber units 102, 122 (portable and/or mobile vehicular units) and one or more base stations, shown as base station 104 operating within an RF site 106. The RF site 106 includes an RF site controller 108 that manages site resources for the one or more base stations, such as base station 104. For example, the RF site controller 108 manages availability of control channel(s) 110 and voice channel(s) 112 for use by the base station 104. The RF site controller 108 is provisioned with a global positioning system (GPS) represented by GPS1, GPS2 providing satellite-based radio communications to the base station 104. The GPS provides a highly stable reference signal (with the accuracies of nanoseconds) that continuously aligns internal oven controlled oscillators (not shown) that are used by one or more base stations, such as base station 104 to attain highly accurate synthesizer lock. The embodiments described herein take advantage of the highly stable GPS reference, represented as GPS reference 114 provided to the base station 104. The base station 104 advantageously uses the GPS reference 114 as a basis upon which to derive transmitting and receiving frequencies within a highly accurate frequency range for outbound transmissions and inbound transmissions over the control channel(s) 110 and voice channel(s) 112. These highly accurate transmissions are beneficially used as a basis for tuning a temperature compensated crystal oscillator (TCXO) of subscriber 102 which has drifted off-frequency. For the purposes of this application, the communication system 100 will be described in terms of the base station 104 and the radio subscriber units 102, 122.

During regular operation (subscriber in-tune), the base station 104 sends out periodic control channel outbound transmissions 116, and a radio subscriber unit, such as radio subscriber unit 102, automatically scans for control channel transmissions upon power-up. In response to receiving the control channel outbound transmission 116, the radio subscriber unit 102 sends a registration request over the control channel inbound transmission 118 back to the base station 104. When a subscriber unit, such as radio subscriber 102, is properly tuned, the base station 104 is able to decode the registration request and register the subscriber.

In response to a successful registration, the base station 104 sends back, over the control channel outbound transmission 116, a voice channel assignment to the radio subscriber unit 102. The registered radio subscriber unit 102 may then begin communications with other similarly registered subscriber units (such as radio subscriber unit 122), in response to a press of a push-to-talk (PTT) button 119 at the radio subscriber unit 102. For example, voice communications with another similarly registered subscriber unit, such as radio subscriber unit 122, can take place over an assigned voice channel via inbound voice transmission 124a and outbound voice transmission 124c.

If, however, the registration attempt of the control channel inbound transmission 118 is unsuccessful, then an out-of-tune subscriber condition is determined. An out-of-tune subscriber condition is determined when the radio subscriber unit 102 is still able to receive the outbound transmission 116 over the control channel from the base station 104 but is unable to transmit the inbound transmission 118 for decoding by the base station. The out-of-tune condition may occur when a frequency error at the radio subscriber unit's internal temperature compensated oscillator (TCXO) has caused a frequency drift outside of the base station's tolerance range. The out-of-tune condition may occur for example, when a base station is configured to only receive an inbound transmission that falls within a predetermined range which is narrower than that of the radio subscriber unit 102. For example, the control channel frequency error tolerance range of base station 104 may be set to +/−2 KHz of the current control channel frequency, while the control channel frequency error tolerance of the radio subscriber unit 102 may purposely be set to be wider than the base station, for example +/−4 KHz. In accordance with some embodiments, the out-of-tune condition triggers automated coarse-tuning of the subscriber's internal TXCO to realign (warp) the TCXO frequency closer to its original reference frequency. The automated tuning of the TCXO is described next.

In accordance with the embodiments, the control channel frequency, which is derived based on a highly stable reference signal, such as the GPS reference signal 114, is now advantageously used as a basis for determining frequency error and correction of the subscriber's TCXO. In accordance with the embodiments, a trust message is embedded, by the base station 104, into the periodic control channel outbound transmission 116, the trust message indicating, to the subscriber, that the control channel frequency is a stable and reliable frequency which can be used for tuning the subscriber TCXO. The control channel outbound transmission 116 including the trust message is transmitted periodically from the base station 104.

In accordance with some embodiments, the radio subscriber unit 102 receives and decodes the trust message, and in response thereto, incrementally expands an automatic frequency control (AFC) range of the subscriber unit beyond a pre-stored default limit. Measurements are taken during the AFC expansion to determine a frequency error associated with the control channel outbound transmission 116. Such measurements are taken until the measured frequency error is determined to fall within the extended AFC range. The subscriber's TCXO is then tuned using the determined frequency error. In accordance with some embodiments, the determined frequency error is used to realign (warp) the TCXO towards its original frequency, thereby minimizing reference clock signal errors of the TCXO. The radio subscriber unit 102 then automatically registers over the control channel inbound transmission 118, with the base station 104 using the tuned TCXO.

The radio subscriber unit 102, in response to a successful registration, receives a voice channel assignment 120 sent back from the base station 104 over the control channel. The subscriber unit 102 may then communicate over the assigned voice channel in response to a press of the PTT button 119 at the radio subscriber unit 102. The subscriber unit 102 may, for example, communicate over the assigned voice channel, with radio subscriber unit 122.

The tuning value derived from the frequency error associated with the control channel outbound transmission may be stored in persistent memory of the subscriber unit 102 and applied to tune the subscriber's internal TCXO in response to subsequent power-ups of the radio subscriber unit 102. In some embodiments, this tuning value associated with the control channel outbound transmission may be referred to as a coarse-tuning value, and the frequency error may be referred to as control channel frequency error.

The radio subscriber unit 102 may then engage in voice communications, in response to a press of PTT button 119, over the assigned voice channel, as represented by inbound voice transmission 124a during PTT press. While coarse-tuning enables the PTT voice communications, it may be further desirable to fine-tune the TCXO for improved voice communications. In accordance with further embodiments, the radio subscriber unit 102 may additionally be fine-tuned by receiving, back from the base station 104 over the voice channel, a measured inbound frequency error 124b associated with the voice channel frequency that is measured against the GPS reference. The radio subscriber unit 102 then fine-tunes its TCXO based on the measured inbound frequency error. The radio subscriber unit 102 may store the measured inbound frequency error as a fine-tuned frequency error in the persistent memory of the subscriber unit. The stored fine-tuned frequency error may be applied to tune the TCXO in response to subsequent power-ups of the radio subscriber unit.

Hence, the embodiments provide for coarse tuning and may further provide for additional fine-tuning of the TXCO of the radio subscriber unit 102.

Figure 2:
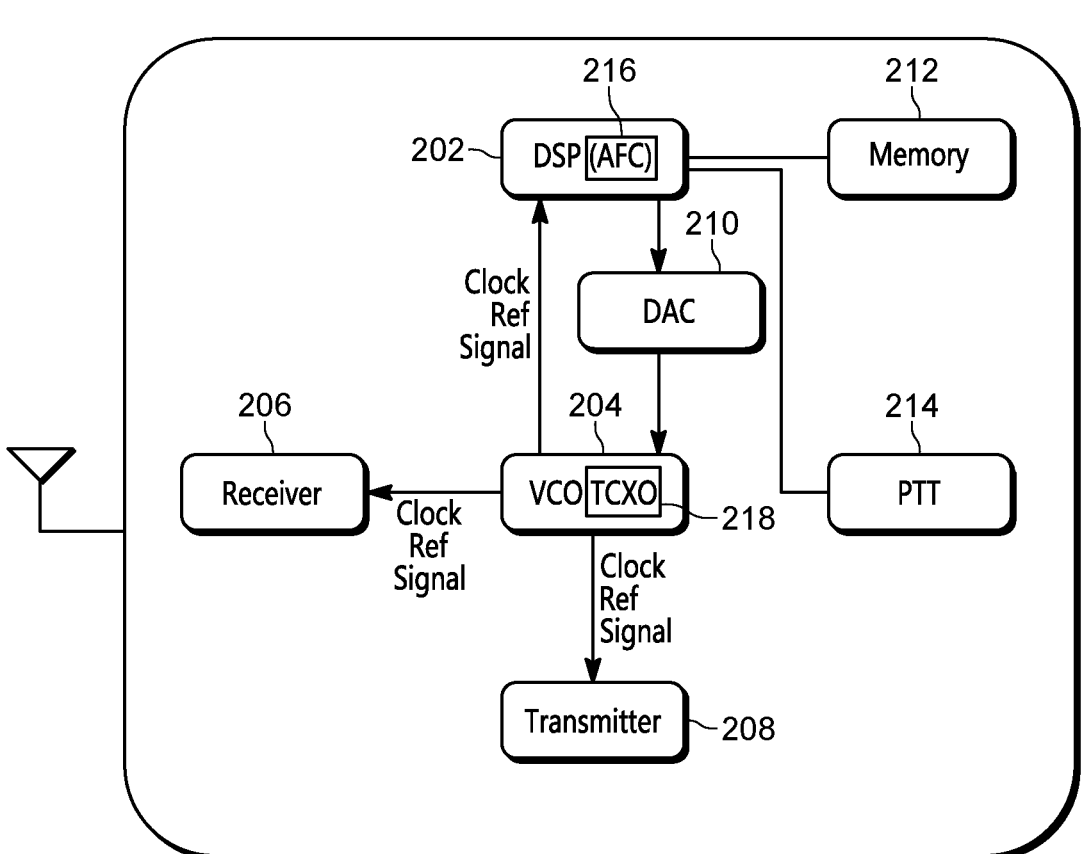
FIG. 2 is a block diagram of a radio subscriber unit of the communication system of FIG. 1 formed and operating in accordance with some embodiments.

FIG. 2 is a block diagram of a radio subscriber unit 200, such as radio subscriber unit 102 of FIG. 1, formed and operating in accordance with some embodiments. The radio subscriber unit 200 comprises a microcontroller 202 operatively coupled to a voltage controlled oscillator (VCO) 204, receiver 206, transmitter 208, digital-to-analog converter (DAC) 210, memory 212, and push-to-talk (PTT) button 214. The microcontroller 202 includes an automatic frequency control (AFC) engine 216. The VCO 204 includes a temperature compensation crystal oscillator (TCXO) 218 from which subscriber reference clock signals and timing are derived, for example RF carrier, audio, and over-the-air (OTA) protocol synchronization functions, to name a few. The DAC 210 is operatively coupled between the AFC 216 to the TCXO 218 to provide tuning of the TCXO under the conditions described herein. The block diagram is simplified for ease of description, without showing additional radio elements such as power amplifiers, low-noise amplifiers, audio circuitry, filters, mixers and switches which are understood for regular trunked radio operation.

The TCXO 218 operates by employing a temperature compensation network that senses ambient temperature and pulls the crystal to its nominal value. As mentioned previously a subscriber unit that has been left unused may age and incur a frequency drift of the TCXO reference clock signal which may cause performance issues including an inability to receive and/or transmit properly. The radio subscriber unit 200 has been configured in accordance with the embodiments to re-tune an out-of-tune TCXO to overcome such issues.

The microcontroller 202 including the automatic frequency control (AFC) engine 216 automatically corrects TCXO frequency errors measured from tracking a reference receive signal (outbound transmission 116 of the base station of FIG. 1). However, the AFC engine 216, as previously described, may be purposely designed for operational limits to avoid the radio 'chasing' a receive signal that has drifted too far off from the current channel frequency. These limits are set to avoid tracking an interferer frequency (spur or rogue frequency) which might cause a loss of communication. Hence, the control channel frequency error tolerance of the radio subscriber unit 200 may be greater (wider frequency range) than the control channel frequency error tolerance of the base station of FIG. 1. For example, the AFC engine 216 may be configured to correct frequency error of up to +/−4 KHz, whereas a base station, such as shown in FIG. 1, may be configured for a tighter tolerance range so as to only receive inbound transmissions that fall, for example, within +/−2 KHz of the current channel frequency.

In accordance with the embodiments, the radio subscriber unit 200 takes advantage of a highly stable reference signal available to trunked systems, such as the GPS reference signal, as provided by the base station of FIG. 1. The GPS reference signal is used as a basis to adjust the subscriber's TCXO 218 while the subscriber is affiliated to the base station upon power up.

In accordance with the embodiments, the microcontroller 202 is configured to receive and decode a trust message periodically sent from the base station over the control channel frequency, wherein the control channel frequency is derived from the GPS signal. The trust message may be decoded by the microcontroller 202 in response to an unsuccessful registration attempt (by the radio subscriber unit to register with the base station) when the radio subscriber unit is powered on. It is also possible that the decoding of the trust message take place automatically, without a failed registration attempt. The inability to register indicates an out-or-tune TCXO condition. The microcontroller 202 may determine that the TCXO is an out-of-tune TCXO based on the unsuccessful registration attempt, as well as the radio subscriber unit still being able to receive an outbound transmission from the base station while still being unable to transmit an inbound transmission through to the base station.

In accordance with the embodiments, the trust message, embedded in the control channel frequency, is indicative of a valid base station that generates a stable GPS-based reference signal. The microcontroller 202, in response to receiving the control channel outbound transmission and decoding the trust message, is configured to incrementally extend its AFC range beyond a pre-stored default limit, while measurements are taken by the AFC engine 216 to determine frequency error associated with the received outbound transmission over the control channel. Such adjustments and measurements are taken until the measured frequency error is determined to fall within the extended AFC range.

The microcontroller 202 is configured to tune the TCXO 218 using the determined frequency error to align (warp) the TCXO towards its original frequency, thereby minimizing frequency error associated with the TCXO reference clock. For example, the frequency error measurement determined by the microcontroller's AFC 216 may be forwarded to the DAC 210 operatively coupled to the AFC engine of the microcontroller for tuning the TCXO 218.

The microcontroller 202 is further configured to register over the control channel, with the base station using the tuned TCXO (tuned based on the frequency error determined by the AFC). Once registered, the subscriber may request and receive a voice channel assignment over the control channel, in response to a press of the PTT button 214. The inbound signal, sent over the control channel, requesting voice channel assignment to the base station may be measured by the base station for control channel frequency error of the inbound signal.

The radio subscriber unit 200 receives, back from the base station over the assigned voice channel, the measured inbound frequency error associated with the inbound signal control channel frequency, and fine-tunes the TCXO based on the measured inbound frequency error. The measured inbound frequency error may be processed through the DAC 210 to fine-tune the TCXO 218.

Hence, the outbound signal frequency error may be used to adjust/expand the AFC to coarse-tune the TCXO, and the inbound signal frequency error may be used to fine-tune the TCXO. One or both values may be stored in the persistent memory 212 to tune the TCXO 218 upon subsequent power ups. For example, the microcontroller may be further configured to apply the fine-tuned frequency error to tune the TCXO in response to subsequent power-ups of the radio subscriber unit.

One or both of the coarse-tuning and fine-tuning values may be stored in persistent memory of the subscriber. Storing the coarse-tuning value allows for a faster reconnect should a call should be dropped prior to completion of fine tuning.

FIG. 3 is a flowchart of a method 300 for tuning a radio subscriber unit of a trunked communication system in accordance with some embodiments. For example, the method 300 may be applied for tuning the radio subscriber unit 102 of trunked communication system 100 of FIG. 1. Method 300 begins at 302 by powering on the radio subscriber unit and detecting an outbound control channel transmission sent periodically from the base station at 304, the outbound control channel transmission being synchronized to a GPS reference signal, such as previously described.

The method continues at 306 with the radio subscriber unit attempting to register with the base station over the control channel. When the registration attempt is successful at 308, a voice channel is assigned and the radio subscriber unit proceeds to communicate over the assigned voice channel in response to a PTT press at the radio subscriber unit. For example, the subscriber unit 102 of FIG. 1 may send voice communications to subscriber unit 122 over voice channel 112 via inbound voice transmission 124a and outbound voice transmission 124c.

An unsuccessful registration attempt at 308 wherein the radio subscriber unit is still able to receive an outbound signal from the base station but is unable to transmit an inbound transmission through to the base station is indicative of an out-of-tune temperature compensated oscillator (TCXO) condition of the radio subscriber unit. The out-of-tune TCXO conditions triggers tuning of the TCXO in accordance with the embodiments described below.

When the registration attempt is not successful at 308, the method provides at 312 for receiving and decoding a trust message embedded in the periodic control channel outbound transmission. The outbound control channel transmission is sent by the base station over a control channel frequency that is aligned to a highly stable GPS reference, as previously described. The trust message is indicative of a valid base station providing the stable GPS-derived reference signal. The indication of a stable reference signal triggers the radio subscriber unit to incrementally extend the subscriber's automatic frequency control (AFC) range beyond its pre-stored default limits. Extending the AFC range enables the subscriber to track the base station's outbound control channel signal and to correct for frequency error.

In accordance with some embodiments, the method continues to 314 where the radio subscriber unit, in response to decoding the trust message, incrementally expands its internal automatic frequency control (AFC) range beyond a pre-stored default limit, while simultaneously measuring a frequency error associated with the control channel outbound transmission, sent from the base station. Such incremental adjustments and measurements take place until the measured frequency error associated with the control channel outbound transmission is determined to fall within the extended AFC range.

The method moves to 316, with tuning the subscriber TCXO using the determined control channel frequency error to align (warp) the TCXO towards its original frequency, thereby minimizing the subscriber's TCXO reference clock signal error. Warping refers to phase warping which manipulates the output phase of the oscillator relative to the input phase. This initial tuning may also be referred to as coarse-tuning of the TCXO. For example, the control channel frequency error may be received by the subscriber microcontroller and processed (for example, through the DAC of FIG. 2) to coarse-tune the subscriber TCXO. The control channel frequency error may be advantageously stored in memory for automatic retrieval and coarse-tuning during another power cycle of the subscriber.

The method 300 then proceeds to 318 with the radio subscriber unit, now coarsely tuned, automatically registering with the base station. Registering the radio subscriber unit includes automatically sending a registration request, by the subscriber unit to the base station, and receiving back a voice channel assignment, as was represented by voice channel assignment signal 120 of FIG. 1. The registered subscriber unit now proceeds to communicate over the assigned voice channel in response to a PTT press at 320.

The method proceeds to 322 with measuring a frequency error of an inbound voice transmission on the voice channel while voice channel communications are taking place. This frequency error measurement, voice channel frequency measured against the GPS reference, is taken by the base station over various time samples during the voice communications. For example, frequency error measurements may be taken on the inbound voice transmission 124a of FIG. 1 while the PTT 119 is being pressed.

Once communications have ceased, as a result of the PTT being released (dekeyed) at 324, then the measurements stop. The method proceeds to 328 with sending the measured frequency error of the inbound transmission over the voice channel (from the base station to the subscriber). For example, referring briefly back to FIG. 1, the measured inbound frequency error associated with inbound voice transmission 124a may be sent to the subscriber at the end of the subscriber transmission (PTT released) over the assigned voice channel, as represented by measured inbound frequency error 124b.

Returning to method 300, the subscriber receives the measured frequency error back from the base station at 328, and the method proceeds to 330 with fine-tuning the TCXO based on the measured frequency error associated with the voice channel. For example, the voice channel frequency error may be received by the subscriber microcontroller and processed (for example, through the DAC of FIG. 2) to fine-tune the subscriber TCXO. The voice channel frequency error may be advantageously stored in memory at 332 for automatic retrieval and fine-tuning during another power cycle of the subscriber.

Figure 4:
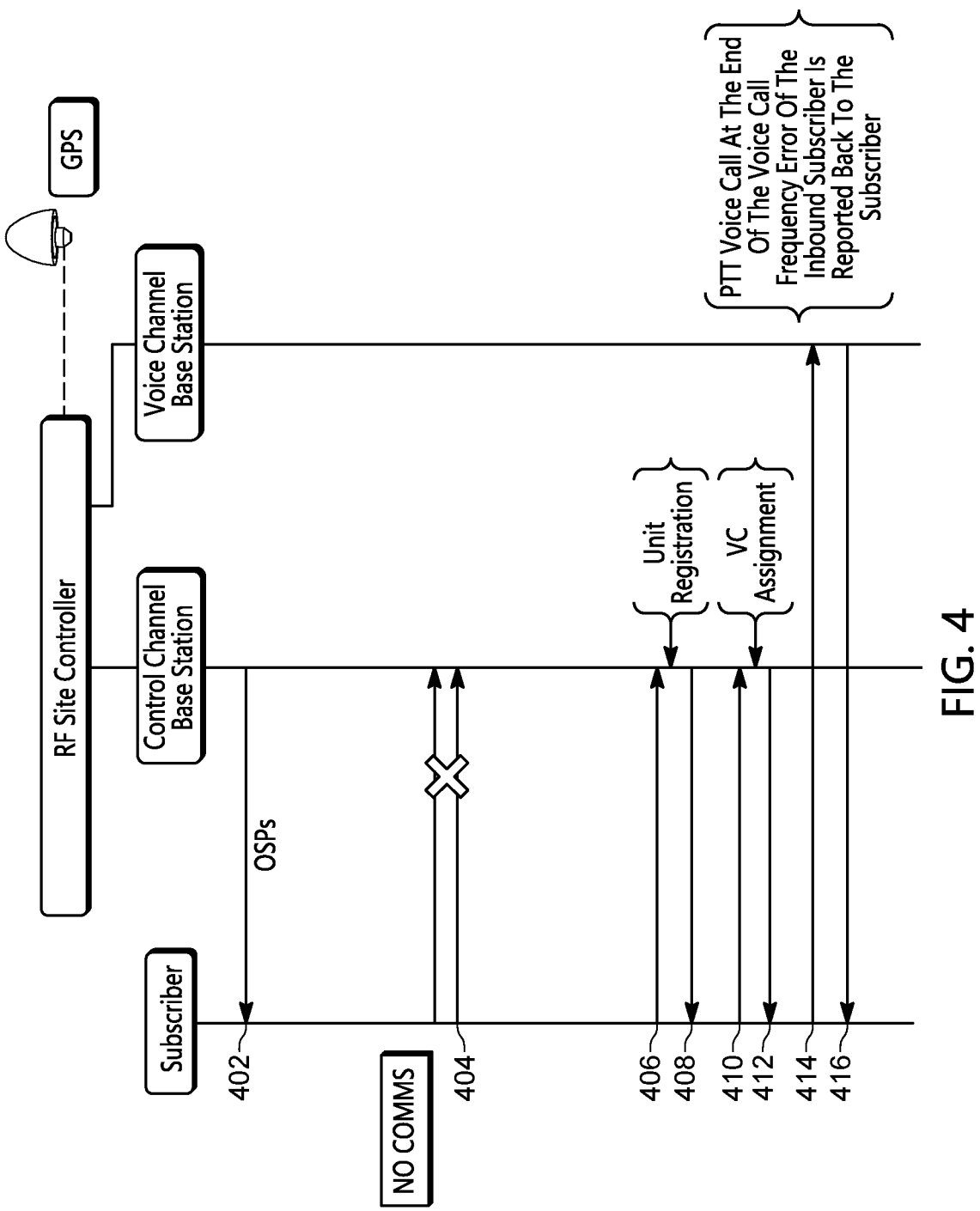
FIG. 4 is a transition diagram for automatic frequency tuning operation in accordance with some embodiments.

Accordingly, the method 300 beneficially provides coarse tuning the TCXO based on control channel frequency error, and, if needed, further fine-tuning the TCXO based on voice channel frequency error. The control channel frequency error is determined based on incremental expansion of the AFC beyond a pre-stored default limit while measuring frequency error of the control channel outbound transmission until the measured frequency error falls within the expanded AFC range. The voice channel frequency error is based on measured error of inbound transmissions over the voice channel during PTT communications FIG. 4 is a transition diagram of the tuning operation in accordance with some embodiments. In this example, the subscriber may have an AFC range of +/−4 KHz, while the base station may have a tighter tolerance range of +/−2 KHz.

An out-of-tune subscriber (for example out-of-tune by greater than +/−4 KHz) is powered ON and scans for a control channel from the base station.

The out-of-tune radio subscriber unit receives outbound signaling packets (OSPs) of an outbound control channel signal at 402, sent from the base station. However, any attempts at registration by the subscriber back to the base station at 404 are unsuccessful, thereby establishing that the subscriber's TCXO frequency as being in need of re-tuning.

The control channel outbound signal at 402 is transmitted using a highly stable reference frequency, such as derived from a GPS frequency associated with the trunked system. In accordance with some embodiments, the control channel outbound signal 402 includes a trust message embedded therein which is decoded by the subscriber. The decoded trust message advantageously indicates to the subscriber that the control channel frequency is a highly stable frequency suitable for using as a reference for re-tuning the subscriber. The decoding of the trust message may take place automatically, prior to a registration attempt, during a registration attempt, and/or after a failed registration attempt.

The subscriber unit, in response to decoding the trust message indicative of the highly stable reference, now attempts to register with the base station at 406 by incrementally expanding the subscriber's automatic frequency control (AFC) range beyond a pre-stored default limit, while simultaneously measuring the frequency error associated with the control channel outbound signal. Such adjustments and measurements take place until the control channel measured frequency error is determined to fall within the subscriber's extended AFC range. For example, the subscriber's AFC range may be incrementally expanded in 100 Hz increments to +/−4500 Hz to correct for the control channel frequency error as measured in the subscriber.

The TCXO is then tuned using the determined control channel frequency error to warp the TCXO towards its original frequency, thereby minimizing the subscriber's TCXO reference clock signal error. For example, a TCXO having a nominal reference of 19.2 MHz that is out-of-tune by 100 Hz may be realigned by the subscriber DAC of FIG. 2 by 96 Hz. The coarse tuning of the TCXO frequency falls short by 4 Hz because the correction ceases when the remaining control channel error falls below a predetermined AFC threshold, for example a 200 Hz AFC threshold. Any remaining correction may be made via the fine-tuning process (described at 414/416).

Registration is acknowledged at 408. The tuning value used to tune the TCXO may be stored in subscriber memory as a coarse tuning value to be used during power up of the subscriber unit.

In some embodiments, additional fine-tuning may be performed after the AFC adjustment. Fine tuning takes place by taking error measurements during voice communications over the voice channel. The voice communications are enabled by the subscriber automatic request for a voice channel assignment at 410, and in response thereto a voice channel assignment is sent back over the control channel from the base station to the subscriber at 412.

Voice call communications take place over the voice channel at 414 during a PTT press of the subscriber. In accordance with some embodiments, a frequency error measurement is made by the base station of inbound transmissions from the subscriber to determine the inbound channel frequency error associated with the voice channel.

In response to a de-keying (PTT release, voice communications end) at the subscriber unit, the base station at 416 sends feedback, over the voice channel, the measured inbound frequency error associated with the subscriber's voice channel transmission. The TCXO is then fine-tuned, via the DAC of FIG. 2, based on the measured inbound frequency error associated with the subscriber's voice channel transmission. The DAC value used for fine-tuning the TCXO may advantageously be stored in persistent memory of the subscriber for subsequent power-ups of the subscriber.

The embodiments facilitate the automatic re-tuning of a radio subscriber unit that has drifted off-frequency. The re-tuning of the subscriber is seamless to the user. Either coarse tuning alone or coarse tuning combined with fine tuning may be applied to the subscriber and stored in persistent memory for application during subscriber power-up cycles. The re-tuning may be accomplished in the field without having to return the subscriber to a service center and without the use of additional circuitry, interface cables or piece parts.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with a TCXO, nor adjust and measure frequency error on outbound and inbound signals over a control channel.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio subscriber unit, comprising:
a temperature compensated crystal oscillator (TCXO) generating a reference clock signal;
a microcontroller coupled to the TCXO, the microcontroller configured to:
receive and decode a trust message periodically sent from a base station over a control channel frequency, wherein the control channel frequency is derived based on a GPS signal;
in response to the trust message, incrementally expand an automatic frequency control (AFC) range of an AFC engine beyond a pre-stored default limit, while measuring, by the AFC engine, a frequency error associated with a control channel outbound transmission until the measured frequency error is determined to fall within the expanded AFC range; and
coarse-tune the TCXO using the determined frequency error to align the TCXO towards its original frequency, thereby minimizing frequency error associated with the TCXO reference clock.

2. The radio subscriber unit of claim 1, wherein a control channel frequency error tolerance of the radio subscriber unit is wider than the base station.

3. The radio subscriber unit of claim 1, wherein the trust message is indicative of a valid base station that generates a stable GPS-based reference signal.

4. The radio subscriber unit of claim 1, wherein the trust message is decoded in response to an unsuccessful registration attempt by the radio subscriber unit to register with the base station when the radio subscriber unit is powered on.

5. The radio subscriber unit of claim 1, wherein the microcontroller is further configured to:
determine that the TCXO is an out-of-tune TCXO based on an unsuccessful registration attempt and wherein the radio subscriber unit is able to receive an outbound transmission from the base station but is unable to transmit an inbound transmission through to the base station.

6. The radio subscriber unit of claim 1, wherein the TCXO is coarse-tuned by a digital-to-analog converter (DAC) operatively coupled to the AFC engine of the microcontroller.

7. The radio subscriber unit of claim 1, wherein the microcontroller is further configured to:
register, over the control channel, the radio subscriber unit with the base station using the coarse-tuned TCXO;
enable push-to-talk (PTT) communications over a voice channel by pressing a PTT of the subscriber;
receive, back from the base station over the voice channel, a measured inbound frequency error associated with an inbound voice transmission of the radio subscriber unit; and
fine-tune the TCXO based on the measured inbound frequency error.

8. The radio subscriber unit of claim 7, wherein the measured inbound frequency error is sent to the radio subscriber unit when the PTT is released.

9. The radio subscriber unit of claim 7, wherein the microcontroller is further configured to:
store the measured inbound frequency error as a fine-tuned frequency error in a persistent memory of the subscriber unit.

10. The radio subscriber unit of claim 9, wherein the microcontroller is further configured to:
apply the fine-tuned frequency error to tune the TCXO in response to power-up of the radio subscriber unit.

11. The radio subscriber unit of claim 1, wherein the radio subscriber unit and base station operate within a trunked communication system.

12. A method of tuning a radio subscriber unit in a communication system, comprising:
determining that a temperature compensated crystal oscillator (TCXO) of the subscriber unit is out-of-tune;
receiving and decoding a trust message embedded in a control channel outbound transmission sent periodically from a base station over a control channel frequency that is aligned to a stable GPS reference;
incrementally extending an automatic frequency control (AFC) range of the radio subscriber unit beyond a pre-stored default limit in response to the trust message, while measuring a frequency error of the control channel outbound transmission until the measured frequency error is determined to fall within the extended AFC range; and
coarse-tuning the TCXO using the determined frequency error.

13. The method of claim 12, wherein a control channel frequency error tolerance associated with the radio subscriber unit is wider than the base station.

14. The method of claim 12, wherein the trust message is indicative of a valid base station having a stable reference frequency.

15. The method of claim 12, wherein the trust message is decoded in response to an unsuccessful registration attempt by the radio subscriber unit to register with the base station when the radio subscriber unit is powered on.

16. The method of claim 12, further comprising:
registering, over the control channel, with the base station using the coarse-tuned TCXO;
enabling push-to-talk (PTT) communications over a voice channel by pressing a PTT of the subscriber;
receiving, back from the base station over the voice channel, a measured inbound frequency error associated with an inbound voice transmission of the radio subscriber unit; and
fine-tuning the TCXO at the subscriber based on the measured inbound frequency error.

17. The method of claim 16, wherein the measured inbound frequency error is measured by the base station and sent to the radio subscriber unit when the PTT of the radio subscriber unit is released.

18. The method of claim 16, further comprising:
storing the measured inbound frequency error as a fine-tuned frequency error in a persistent memory of the subscriber unit.

19. The method of claim 18, further comprising:
applying the fine-tuned frequency error to tune the TCXO during power-up cycles of the radio subscriber unit.

20. The method of claim 12, further comprising:
enabling communication over a voice channel in response to a push-to-talk (PTT) press at the radio subscriber unit.

21. The method of claim 12, wherein the communication system is a trunked radio communications system.

22. A trunked communication system, comprising:
a base station;
a plurality of radio subscriber units, wherein at least one radio subscriber unit comprises a microcontroller configured to:

16 scan and detect a control channel outbound transmission from the base station;
decode a trust message embedded within the control channel outbound transmission, the trust message being indicative of a stable GPS reference frequency associated with the base station;
expand an automatic frequency control (AFC) range beyond default limits while taking frequency error measurements of the control channel outbound transmission until the measured frequency error is determined to fall within an expanded AFC range; and
coarse-tune a TCXO of the radio subscriber unit based on the measured frequency error determined to fall within the expanded AFC range.

23. The trunked communication system of claim 22, wherein the trust message is decoded in response to an unsuccessful registration attempt by the radio subscriber unit to register with the base station when the radio subscriber unit is powered on.

24. The trunked communication system of claim 22, wherein the microcontroller is further configured to:
register with the base station, over the control channel, using an inbound transmission derived from the coarse-tuned TCXO;
enable push-to-talk (PTT) communications over a voice channel by pressing a PTT of the radio subscriber unit;
receive, back from the base station over the voice channel, a measured inbound frequency error associated with an inbound voice transmission of the radio subscriber unit; and
fine-tune the TCXO based on the measured inbound frequency error.

* * * * *